United States Patent
Kume

(10) Patent No.: US 9,197,052 B2
(45) Date of Patent: Nov. 24, 2015

(54) UMBILICAL MEMBER GUIDE DEVICE AT FRONT END PART OF WRIST OF INDUSTRIAL ROBOT AND INDUSTRIAL ROBOT

(71) Applicant: FANUC CORPORATION, Minamitsuru-gun, Yamanashi (JP)

(72) Inventor: Hirokazu Kume, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 81 days.

(21) Appl. No.: 14/072,221

(22) Filed: Nov. 5, 2013

(65) Prior Publication Data

US 2014/0130631 A1   May 15, 2014

(30) Foreign Application Priority Data

Nov. 12, 2012 (JP) ................... 2012-248500

(51) Int. Cl.
 *B25J 17/02* (2006.01)
 *H02G 11/00* (2006.01)
 *B25J 19/00* (2006.01)
 *H02G 3/22* (2006.01)
 *H02G 3/32* (2006.01)

(52) U.S. Cl.
 CPC .................. *H02G 11/00* (2013.01); *B25J 17/02* (2013.01); *B25J 19/0025* (2013.01); *H02G 3/22* (2013.01); *H02G 3/32* (2013.01); *Y10S 901/50* (2013.01); *Y10T 74/20311* (2015.01)

(58) Field of Classification Search
 CPC .... B25J 19/00; B25J 19/0025; B25J 19/0029; B25J 19/0033; F16L 3/18; Y10S 901/29; Y10T 74/20311
 See application file for complete search history.

(56) References Cited

U.S. PATENT DOCUMENTS

| | | | | |
|---|---|---|---|---|
| 4,705,243 A | * | 11/1987 | Hartmann et al. | ............... 248/51 |
| 6,622,585 B1 | * | 9/2003 | Salomonsson et al. | ..... 74/490.02 |
| 6,696,810 B2 | * | 2/2004 | Uematsu et al. | ......... 318/568.21 |
| 2003/0060929 A1 | | 3/2003 | Kullborg | |
| 2005/0034552 A1 | | 2/2005 | Back | |
| 2005/0189333 A1 | * | 9/2005 | Nakagiri et al. | ............ 219/125.1 |

(Continued)

FOREIGN PATENT DOCUMENTS

| | | |
|---|---|---|
| CN | 1781681 A | 6/2006 |
| CN | 1921989 A | 2/2007 |
| DE | 102004026573 | 12/2005 |

(Continued)

OTHER PUBLICATIONS

Chinese Office Action dated Sep. 26, 2014 for Chinese Patent Application No. 2013105520258.

*Primary Examiner* — William C Joyce
(74) *Attorney, Agent, or Firm* — RatnerPrestia

(57) ABSTRACT

An umbilical member guide device of an industrial robot including an umbilical member guide body interposed between a shaft member and an end effector. The umbilical member guide body includes a first plate part having a first through hole through which the umbilical member passing through the shaft member passes, a second plate part arranged facing the first plate part, and a connecting part connecting the first plate part and the second plate part together and forming an opening part between the first plate part and the second plate part, and the second plate part further has a second through hole and a communicating part communicating the opening part and the second through hole.

8 Claims, 19 Drawing Sheets

(56) References Cited

U.S. PATENT DOCUMENTS

2010/0038495 A1 2/2010 Jinushi et al.
2012/0111135 A1* 5/2012 Ichibangase et al. ...... 74/490.06

FOREIGN PATENT DOCUMENTS

| | | |
|---|---|---|
| EP | 1 083 030 B1 | 4/2007 |
| JP | 62-208888 A | 9/1987 |
| JP | 04-041191 A | 2/1992 |
| JP | 2002-079487 | 3/2002 |
| JP | 2002-528287 A | 9/2002 |
| JP | 2003-305684 A | 10/2003 |
| JP | 2007/190629 * | 8/2007 |
| JP | 2012-096332 | 5/2012 |
| WO | 2006046277 | 5/2006 |

* cited by examiner

UMBILICAL MEMBER GUIDE DEVICE AT FRONT END PART OF WRIST OF INDUSTRIAL ROBOT AND INDUSTRIAL ROBOT

BACKGROUND OF THE INVENTION

1. Field of the Invention

The present invention relates to an umbilical member guide device at a front end part of a wrist of an industrial robot, and an industrial robot.

2. Description of the Related Art

In the past, in an industrial robot with a wrist arm, a wrist flange which is provided rotatably at a front end part of the wrist arm, an intermediate member which is fastened to the wrist flange, and an end effector which is fastened to the intermediate member, a device in which umbilical members are run through the insides of the wrist arm, wrist flange, and intermediate member, are pulled out from the intermediate member to the outside, and are laid to the end effector, are known. This device is, for example, described in Japanese Patent Publication No. 2012-096332A (JP2012-096332A). In the device described in JP2012-096332A, the intermediate member has a fastening part which is fastened to the wrist flange, an end effector mount to which the end effector is attached, and a connecting part which connects the fastening part and the end effector mount. The umbilical members are laid through a first opening part formed in the fastening part and a second opening part formed in the connecting part.

However, in the device described in JP2012-096332A, the center line of the first opening part and the center line of the second opening part perpendicularly intersect. The umbilical members are laid changed in orientation by 90 degrees at the intermediate member. For this reason, for example, when changing umbilical members due to changes in the application of use of the robot, etc., it is necessary to attach and detach the umbilical members to the robot and from the robot while bending them. The work of changing umbilical members is therefore not easy.

SUMMARY OF THE INVENTION

One aspect of the present invention is an umbilical member guide device of an industrial robot for guiding an umbilical member up to an end effector attached to a front end part of an industrial robot, the umbilical member passing through an inside of a shaft member rotating about an axial line, along the axial line. The umbilical member guide device includes an umbilical member guide body interposed between the shaft member and the end effector. The umbilical member guide body includes a first plate part having a first mounting surface attached to a flange surface of an end part of the shaft member and a first through hole opening along the axial line, the umbilical member being passed through the inside of the shaft member and the first through hole; a second plate part arranged facing the first plate part, and having a second mounting surface to which the end effector is attached, at an opposite side to the first plate part; and a connecting part connecting the first plate part and the second plate part together, and forming an opening part which opens in a direction perpendicular to the axial line, between the first plate part and the second plate part. Furthermore, the second plate part has a second through hole formed along the axial line and a communicating part which communicates the opening part and the second through hole.

Further, another aspect of the present invention is an industrial robot including the above umbilical member guide device.

BRIEF DESCRIPTION OF THE DRAWINGS

The objects, features, and advantages of the present invention will become clearer from the following explanation of embodiments given with reference to the attached drawings, wherein.

DETAILED DESCRIPTION

First Embodiment

Figure 1A:
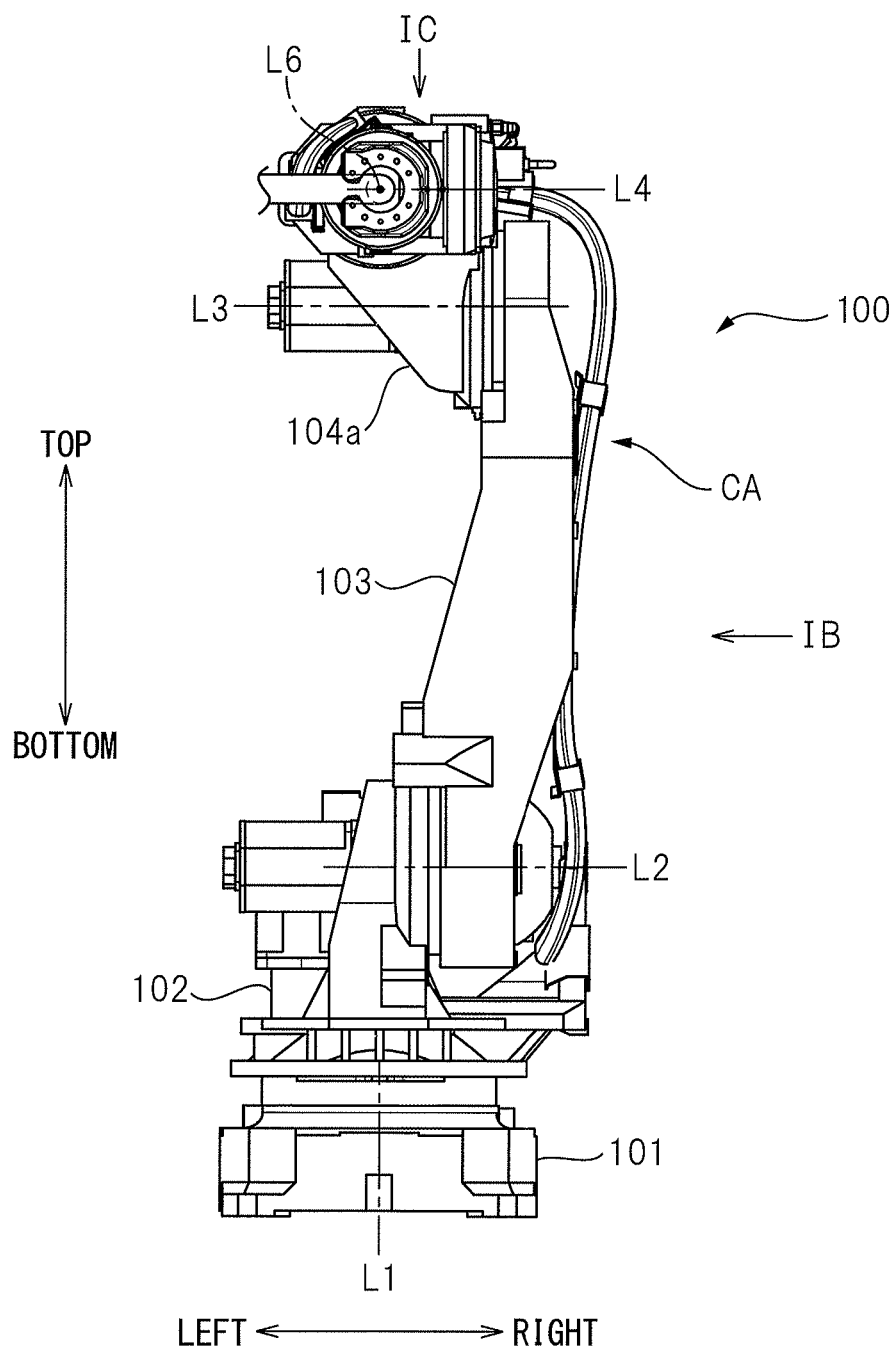
FIG. 1A is a front view which shows the configuration of an industrial robot according to an embodiment of the present invention.
Figure 1B:
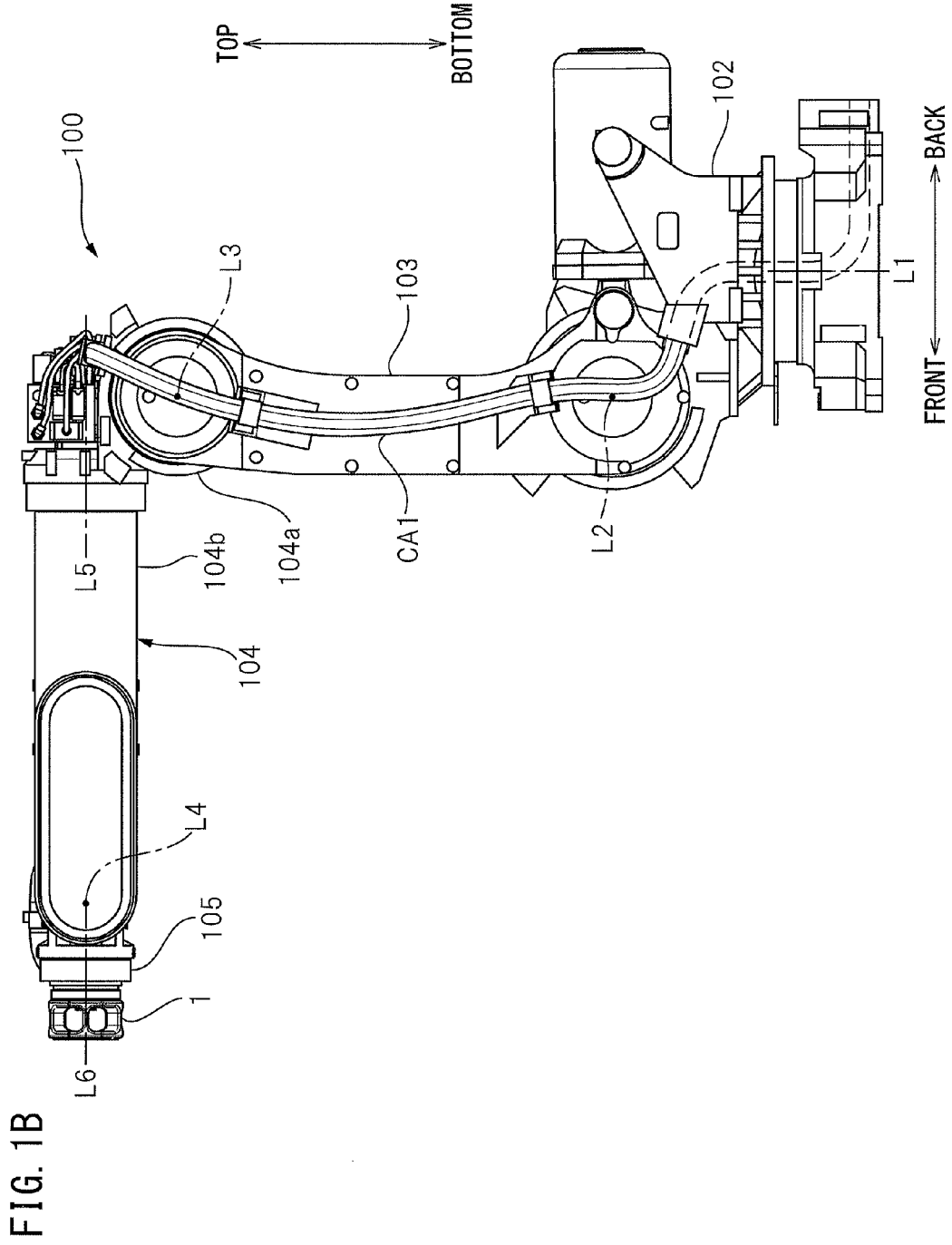
FIG. 1B is a right side view which shows the configuration of an industrial robot according to an embodiment of the present invention.
Figure 1C:
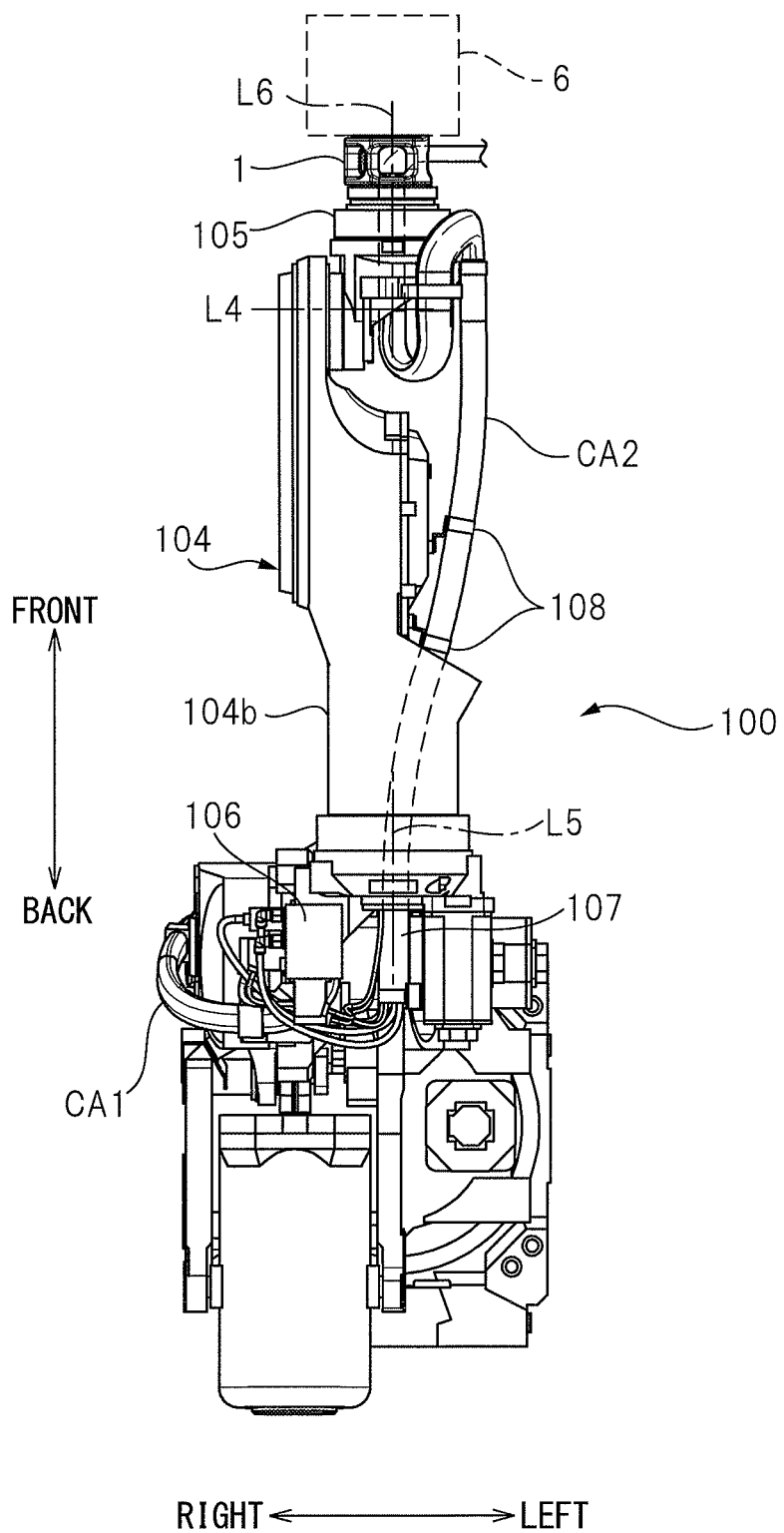
FIG. 1C is a top view which shows the configuration of an industrial robot according to an embodiment of the present invention.

Hereinafter, referring to FIG. 1A to FIG. 11, an umbilical member guide device according to a first embodiment of the present invention will be explained. First, the configuration of an industrial robot to which the umbilical member guide device according to the present embodiment is applied will be explained. FIG. 1A to FIG. 1C are views which shown the configuration of an industrial robot 100 according to an embodiment of the present invention. In particular, FIG. 1A is a front view of a robot 100, FIG. 1B is a right side view of the robot 100 (view along arrow IB of FIG. 1A), and FIG. 1C is a top view of the robot 100 (view along arrow IC of FIG. 1A). Below, as illustrated, a front-back direction, left-right direction, and top-bottom direction of the robot 100 are defined and these definitions followed for explaining the configurations of the parts. These directions change along with operation of the robot 100 and are only set for convenience in understanding the explanation.

As shown in FIG. 1A to FIG. 1C, the robot 100 has a base 101, a swivel 102 which is provided swivably about an axial line L1 extending in a vertical direction and above the base 101, a lower arm 103 which is supported swingably at the swivel 102 in a front-back direction about an axial line L2 extending in a horizontal direction, an upper arm 104 which is supported swingably at a front end part of the lower arm 103 in a top-bottom direction about an axial line L3 extending in the horizontal direction, and a wrist part 105 which is supported swingably at a front end part of the upper arm 104 in the top-bottom direction about an axial line L4 extending in the horizontal direction.

The upper arm 104 has a base end part 104a which is supported swingably at the lower arm 103 and an arm part 104b which is supported at a front surface of the base end part 104a rotatably about an axial line L5. The wrist part 105 has various end effectors 6 (for example, an end effector for welding work) in accordance with the content of the work. FIG. 1C shows an end effector 6 by a broken line. Between the wrist part 105 and the end effector 6, an umbilical member guide body 1 is interposed. The end effector 6 is supported through the umbilical member guide body 1 at the front end part of the wrist part 105 rotatably about an axial line L6 perpendicular to the axial line L4. The swivel 102, lower arm 103, upper arm 104, wrist part 105, and end effector 6 are respectively driven by servo motors.

The robot 100 has a plurality of umbilical members CA (hereinafter, also referred to as the "cables") laid from the base 101 to the swivel 102, lower arm 103, and upper arm 104. The "umbilical members CA" is the general term for wires, tubes, etc. The umbilical members include power lines to the servo motor, various signal lines, and other wires and tubes for supplying liquids and gases, etc. As shown in FIG. 1B, a plurality of umbilical members CA are bundled together. The bundle of umbilical members CA (umbilical member bundle CA1) is laid at the right side surface of the lower arm 103. As shown in FIG. 1C, the umbilical member bundle CA1 is separated into a plurality of umbilical members CA above the lower arm 103. Part of the plurality of umbilical members CA is connected to a distribution board 106 which is provided at a back end part of the upper arm 104.

At the back end part of the upper arm 104, a tubular part 107 is provided along the axial line L5. The plurality of umbilical members CA used for the end effector are inserted into the tubular part 107. The plurality of umbilical members CA inserted into the tubular part 107 are bundled. The bundle of umbilical members CA (umbilical member bundle CA2) is fastened to the left side surface of the upper arm 104 by fastening parts 108 and are laid along the left side surface of the upper arm 104 toward the wrist part 105.

Figure 2:
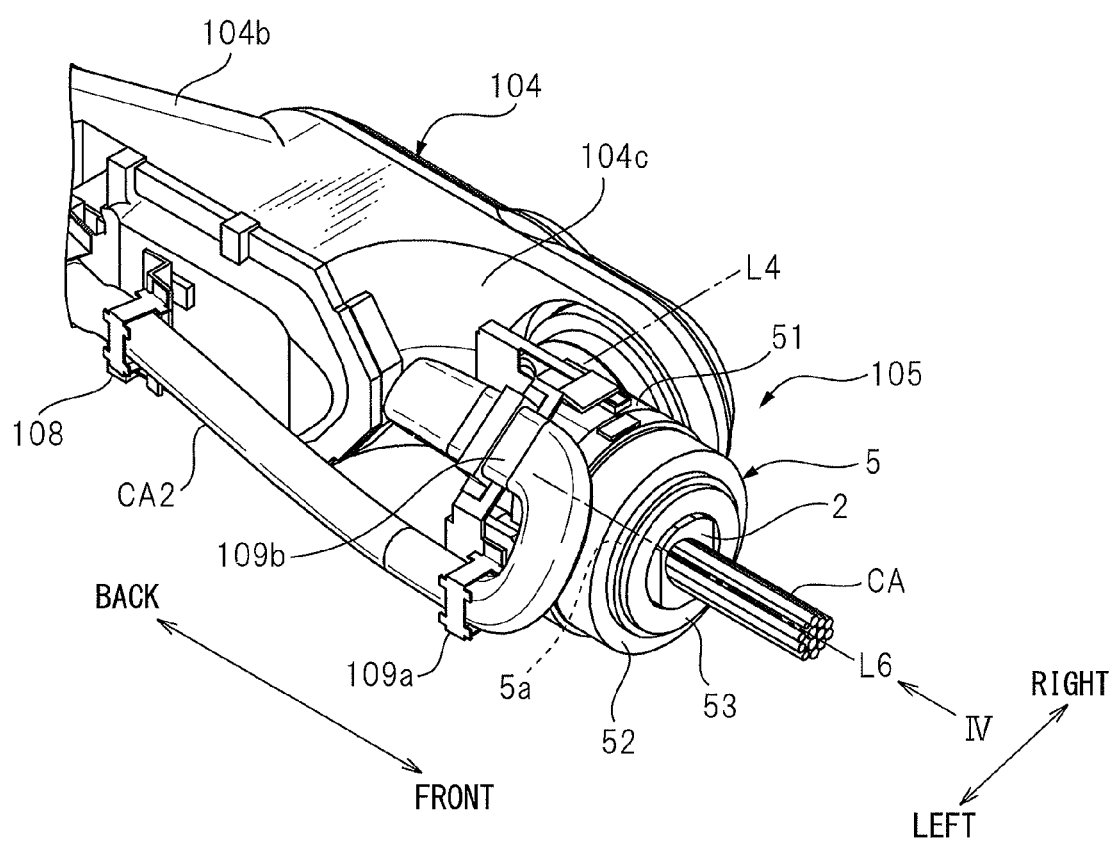
FIG. 2 is an enlarged perspective view which shows the configuration at a front end part of a wrist part of an industrial robot according to an embodiment of the present invention.

FIG. 2 is an enlarged perspective view which shows the configuration of a front end part of the wrist part 105 of the robot 100. In FIG. 2, illustrations of the umbilical member guide body 1 and the end effector 6 are omitted. As shown in FIG. 2, at the left side surface of the upper arm 104 (arm part 104b), a recessed part 104c is formed toward the front end. In the recessed part 104c, a shaft member 5 which forms part of the wrist part 105 is arranged. The shaft member 5 has a base part 51 which is supported at the front end part of the arm rotatably about the axial line L4 and a cylindrical part 52 which is supported at the front end part of the base part 51 rotatably about the axial line L6. The base part 51 and the cylindrical part 52 have hollow parts 5a along the axial line L6.

The umbilical member bundle CA2 which extends forward along the longitudinal direction of the arm part 104b is fastened by the fastening parts 108, then is bent in a U-shape toward the back at the left side of the shaft member 5 and is fastened by the fastening parts 109a and 109b to the base part 51 of the shaft member 5. As shown in FIG. 1C, the umbilical member bundle CA2 is bent into a U-shape toward the front at the back from the shaft member 5 and is inserted from the back end face of the shaft member 5 to the hollow part 5a. As shown in FIG. 2, the umbilical member bundle CA2 inserted into the hollow part 5a is separated into a plurality of umbilical members CA at the hollow part 5a and the umbilical members stick out from the flange surface 53 of the front end face of the shaft member 5.

Figure 3A:
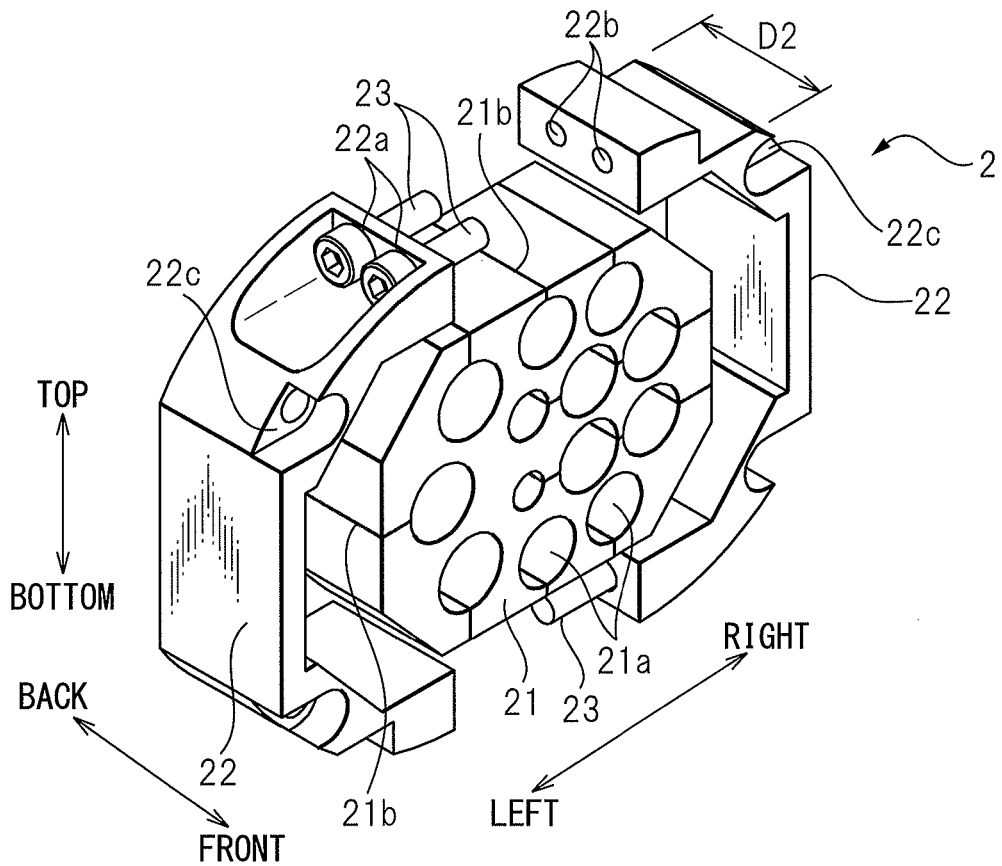
FIG. 3A is a disassembled perspective view of a umbilical member fastening part according to an embodiment of the present invention.
Figure 3B:
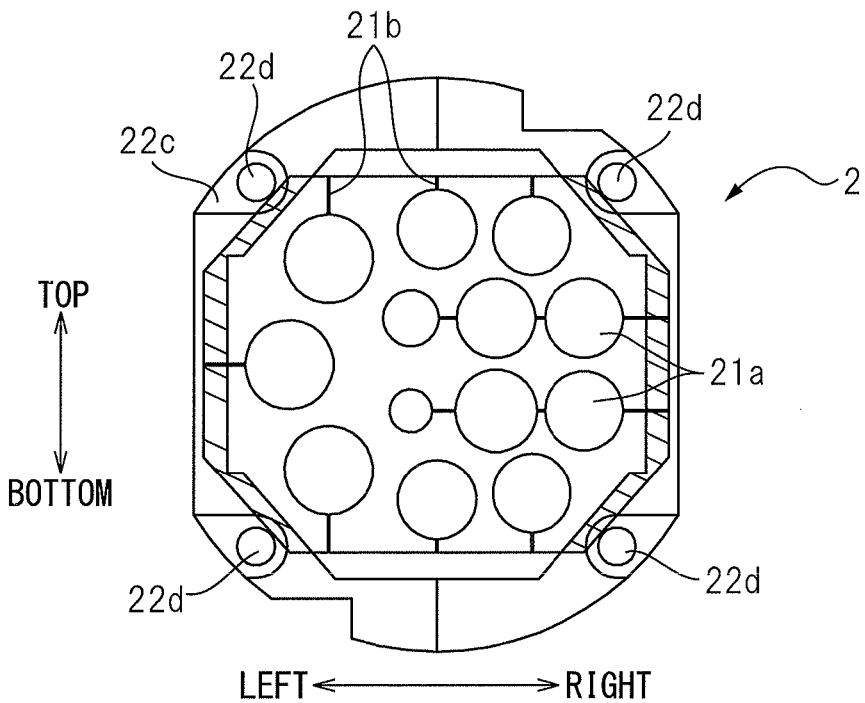
FIG. 3B is a front view which shows an assembled state of a umbilical member fastening part according to an embodiment of the present invention.

At the end part of the flange surface side of the hollow part 5a of the shaft member 5, an umbilical member fastening part 2 which fastens a plurality of umbilical members CA is attached. The plurality of umbilical members CA pass through the umbilical member fastening part 2 and stick out forward. FIG. 3A is a disassembled perspective view of the umbilical member fastening part 2, while FIG. 3B is a front view which shows an assembled state of the umbilical member fastening part 2. As shown in FIG. 3A and FIG. 3B, the umbilical member fastening part 2 has a rubber clamp 21 in which a plurality of through holes 21a are formed so as to allow umbilical members CA to pass through and a pair of left and right clamps 22 which compress the surroundings of the rubber clamp 21.

The rubber clamp 21 is formed with slits 21b from the through holes 21a to the outer circumferential surface of the rubber clamp 21. The umbilical members CA are housed in the through holes 21a through the slits 21b. At one end parts of the clamps 22, through holes 22a are provided, while at the other end parts, screw holes 23b are provided. As shown in FIG. 3A, bolts 23 passed through the through holes 22a of one of the clamps 22 are screwed into the screw holes 22b of the other of the clamps 22, whereby the clamps 22 are fastened with each other. As shown in FIG. 3B, in the state where the clamps 22 are fastened with each other, a compressive force acts on the rubber clamp 21, whereby the surroundings of the rubber clamp 21 (hatched parts) are crushed and the umbilical members CA are fastened.

Figure 4:
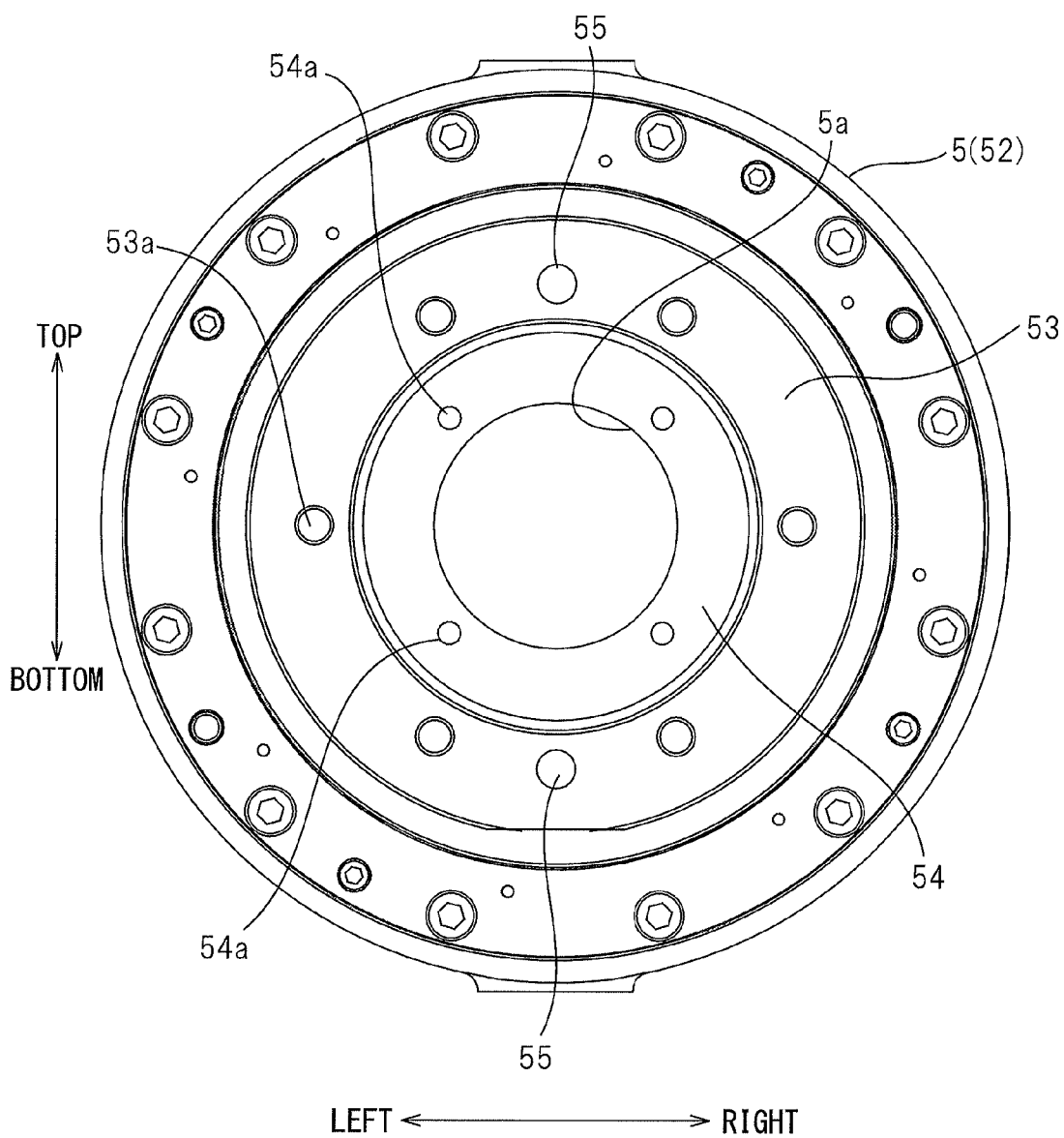
FIG. 4 is a view along an arrow IV of FIG. 2.

As shown in FIG. 3A and FIG. 3B, at the front surfaces of the clamps 22, pairs of seat recesses 22c are formed. At the center parts of these seat recesses 22c, through holes 22d are formed for mounting of the umbilical member fastening part 2. FIG. 4 is a front view of a shaft member 5 standing alone (view along arrow IV of FIG. 2). As shown in FIG. 4, the flange surface 53 of the shaft member 5 (cylindrical part 52) is provided with a plurality of (six) screw holes 53a at equal intervals in the circumferential direction. Pins 55 are provided in a protruding manner at two locations at the top and bottom in the circumferential direction. At the inside of the flange surface 53, a mounting surface 54 is formed for attaching the umbilical member fastening part 2. The mounting surface 54 is provided with a plurality of screw holes 54a corresponding to the through holes 22d of the umbilical member fastening part 2. The umbilical member fastening part 2 is fastened to the shaft member 5 by screwing not shown bolts passing through the through holes 22d to the screw holes 54a of the mounting surface 54.

The mounting surface 54 is formed at the deeper side (back side in FIG. 2) from the flange surface 53 by a predetermined depth D1. The depth D1 of the mounting surface 53 is deeper than the thickness D2 of the umbilical member fastening part 2 (FIG. 3A). In the state fastening the umbilical member fastening part 2 to the shaft member 5, the umbilical member fastening part 2 does not stick out from the flange surface 53. Further, the clamps of the umbilical member fastening part 2 are provided with the seat recesses 22c, so the bolts for attaching the umbilical member fastening part 2 also do not stick out from the flange surface 53.

Figure 5:
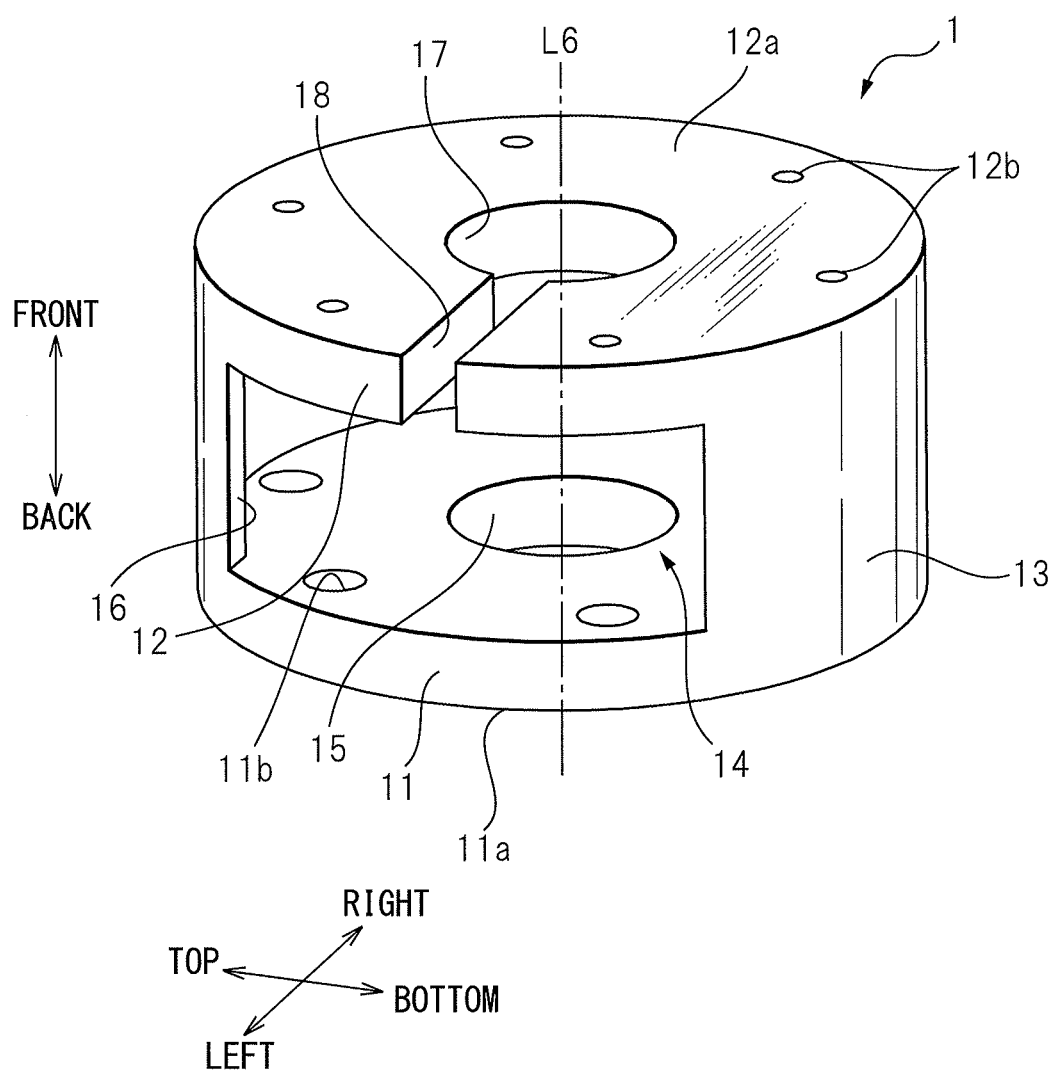
FIG. 5 is a perspective view which shows the general configuration of a umbilical member guide body which forms part of the umbilical member guide device according to a first embodiment of the present invention.

FIG. 5 is a perspective view which shows the general configuration of the umbilical member guide body 1 which is a main component of the umbilical member guide device according to the first embodiment. In FIG. 5, the states of FIG. 1A to FIG. 1C are used as references to define the front-back direction, left-right direction, and top-bottom direction.

As shown in FIG. 5, the umbilical member guide body 1 has a disk shaped first plate part 11 and second plate part 12 which are arranged separated from each in the front-back direction and in parallel with each other, and a connecting part 13 which extends from the peripheral edge part of the first plate part 11 to the peripheral edge part of the second plate part 12 in the front-back direction to connect the first plate part 11 and the second plate part 12 together and which forms a cylindrical space 14 between the first plate part 11 and the second plate part 12.

The first plate part 11 has a first mounting surface 11a which is to be attached to the flange surface 53 of the shaft member 5 at its back end face. At the first plate part 11, a plurality of through holes 11b are formed corresponding to the screw holes 53a of the flange surface 53, and pin holes (not shown) are formed corresponding to the positions of the pins 55. The umbilical member guide body 1 is attached to the flange surface 53 through the plurality of through holes 11b which are formed in the first plate part 11. That is, the pins 55 are inserted into the pin holes to position the umbilical member guide body 1 and in that state, not shown bolts passed through the through holes 11b are screwed into the screw holes 53a of the flange surface 53 (FIG. 4), whereby the umbilical member guide body 1 is attached. The first plate part 11 further has the circular first through hole 15 formed about the axial line L6 at the center part. The hole diameter of the first through hole 15 is, for example, equal to the hole diameter of the hollow part 5a of the shaft member 5 (FIG. 4). All of the plurality of umbilical members CA which stick out from the shaft member 5 can be inserted into the through hole 15.

The connecting part 13 is formed with an opening part 16 in a direction perpendicular to the axial line L6 in the front-back direction (in the figure, the left direction). The "direction perpendicular" which is referred to here means the case where the opening part 16 is formed along the plane which substantially perpendicularly intersects the axial line L6. This includes not only "perpendicular" in the strict sense, that is, the case where the direction in which the opening part 16 is provided is at a right angle to the axial line L6, but also the case where it is substantially orthogonal (for example, the case of 90°±15° or so). The opening part 16 has an opening area which allows all of the plurality of umbilical members CA passed through the first through hole 15 to pass. The plurality of umbilical members CA which pass through the first through hole 15 can be passed through the opening part 16 and taken out to the outside of the space 14.

The second plate part 12 has a second mounting surface 12a for attachment of the end effector 6 at its front end face. The end effector 6 is attached to the umbilical member guide body 1 through the plurality of hole parts 12b which are formed in the second plate part 12. Furthermore, the second plate part 12 has a circular second through hole 17 centered on the axial line L6 at the center part and has a slit 18 which communicates the second through hole 17 and the opening part 16. The hole diameter of the second through hole 17 is equal to the hole diameter of the first through hole 15. The width of the slit 18 is larger than the outside diameter of the umbilical member (maximum outside diameter umbilical member CAmax) with the largest outside diameter among the plurality of umbilical members CA. The plurality of umbilical members CA can move between the second through hole 17 and the opening part 16 through the slit 18.

Figure 6:
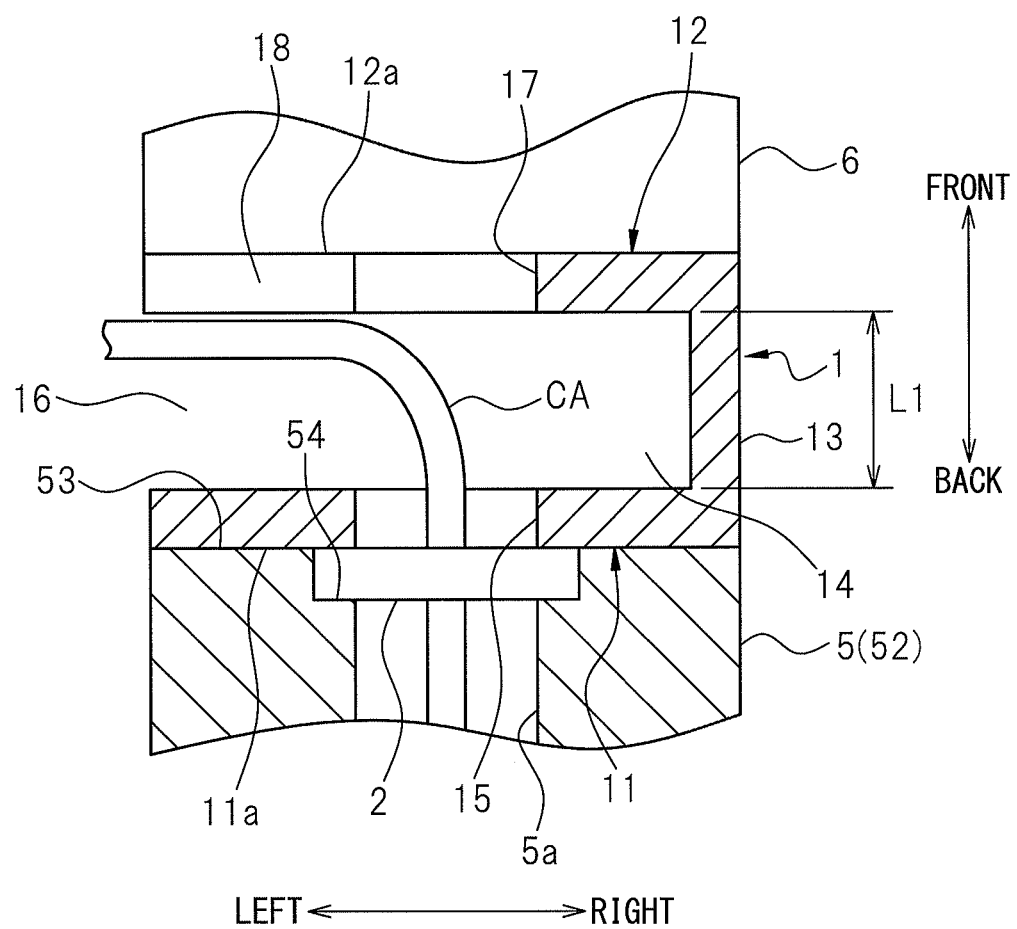
FIG. 6 is a cross-sectional view which schematically shows a mounted state of the umbilical member guide body of FIG. 5.
Figure 7:
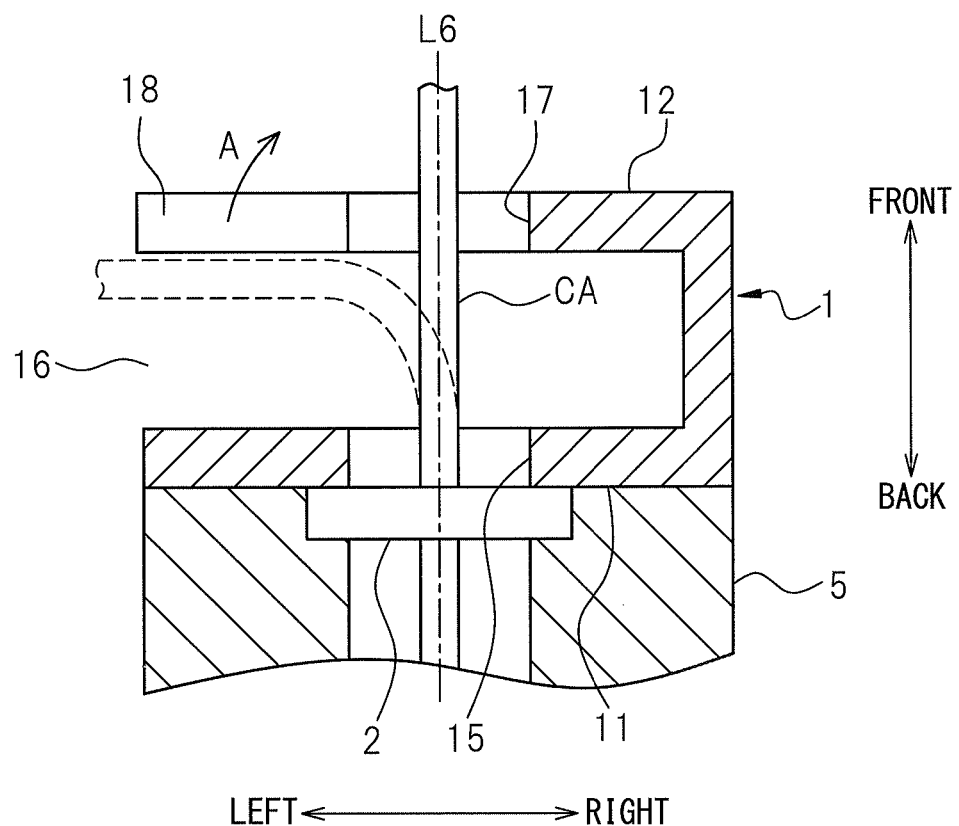
FIG. 7 is a view which explains the procedure in the case of detaching umbilical members from the state of FIG. 6.

FIG. 6 is a cross-sectional view which schematically shows the mounted state of the umbilical member guide body 1 and is a view cut along the slit 18 in the front-back direction. In the figure, for convenience, only a single umbilical member CA is shown. As shown in FIG. 6, the umbilical member CA which sticks out from the umbilical member fastening part 2 is passed through the first through hole 15 of the first plate part 11, then is bent toward the opening part 16. Further, the umbilical member CA is passed through the opening part 16 and taken out to the outside of the space 14, and then it is connected to the end effector 6.

At this time, the radius of curvature of the umbilical member CA is determined by the distance L1 between the first plate part 11 and the second plate part 12. If considering the load which acts on the robot 100, it is necessary to raise the rigidity of the umbilical member guide body 1. Therefore, the distance L1 is preferably shorter. On the other hand, if the radius of curvature of the umbilical member CA becomes less than the minimum radius of curvature, the umbilical member CA (for example, tube) will be damaged (for example, kinked), so the radius of curvature has to be kept from becoming lower than the minimum radius of curvature. Considering the above, in the present embodiment, the distance L1 between the first plate part 11 and the second plate part 12 is set to at least the minimum radius of curvature of the umbilical member CA and to as short a distance as possible (for example, the minimum radius of curvature).

When, for example, detaching the umbilical member CA from this state, first, the end effector 6 is detached from the second mounting surface 12a of the umbilical member guide body 1. Next, as shown by the arrow A of FIG. 7, the umbilical member CA is introduced through the slit 18 of the second plate part 12 to the second through hole 17 of the second plate part 12 and the umbilical member CA is restored to the straight state along the axial line L6. In this case, the width of the slit 18 is larger than even the outside diameter of the maximum outside diameter umbilical member CAmax, so a plurality of umbilical members CA can be inserted into the slit 18 one by one or several umbilical members CA at a time and all can be introduced into the second through hole 17. After this, the umbilical member guide body 1 and the umbilical member fastening part 2 are detached from the shaft member 5, the umbilical member CA is unfastened, and the umbilical member CA is detached from the robot 100.

In this way, in the umbilical member guide device of the first embodiment, a umbilical member guide body 1 is interposed between the wrist part 105 of the robot 100 comprised of the shaft member 5 and the end effector 6. The umbilical member guide body 1 has a first plate part 11 which has a first mounting surface 11a and a first through hole 15 along the axial line L6, a second plate part 12 which is arranged facing the first plate part 11 and has a second mounting surface 12a, and a connecting part which connects the first plate part 11 and the second plate part 12 together and forms an opening part 16 which opens in a direction perpendicular to the axial line L6 between the first plate part 11 and the second plate part 12. The second plate part 12 further has a second through hole 17 along the axial line L6 and a slit 18 which communicates the opening part 16 and the second through hole 17.

Due to this, it is possible to introduce umbilical members CA through the slit 18 to the second through hole 17 and restore the umbilical members CA to a straight state for removal. The work of replacement of umbilical members CA becomes easy. Further, when detaching the umbilical members CA, the umbilical members CA are kept from becoming the minimum radius of curvature or less and damage to the umbilical members CA (kinks, etc.) can be prevented.

Further, in the present embodiment, a plurality of umbilical members CA are passed through the inside of the shaft member 5, the first through hole 15 and the second through hole 17 respectively have hole diameters through which these plurality of umbilical members CA can pass through, and the opening part 16 has an opening area through which a plurality of umbilical members CA can pass through. Furthermore, the slit 18 is a slit of a width larger than the maximum outside diameter umbilical member CAmax among the plurality of umbilical members CA. Due to this, all of the plurality of umbilical members which are laid to the end effector 6 can be made straight in shape along the axial line L6, so the work of changing the plurality of umbilical members CA becomes easy.

In the above embodiment, although a mounting surface 54 of a predetermined depth D1 is formed at the inside of the flange surface 53 of the shaft member 5, it is also possible to form the mounting surface 54 for attaching the umbilical member fastening part 2 at the same plane as the flange surface 53. In this case, the hole diameter of the first through hole 15 of the umbilical member guide body 1 is preferably made larger than the outside diameter of the umbilical member fastening part 2 so as to keep the umbilical member fastening part 2 from interfering with the umbilical member guide body 1.

Figure 8:
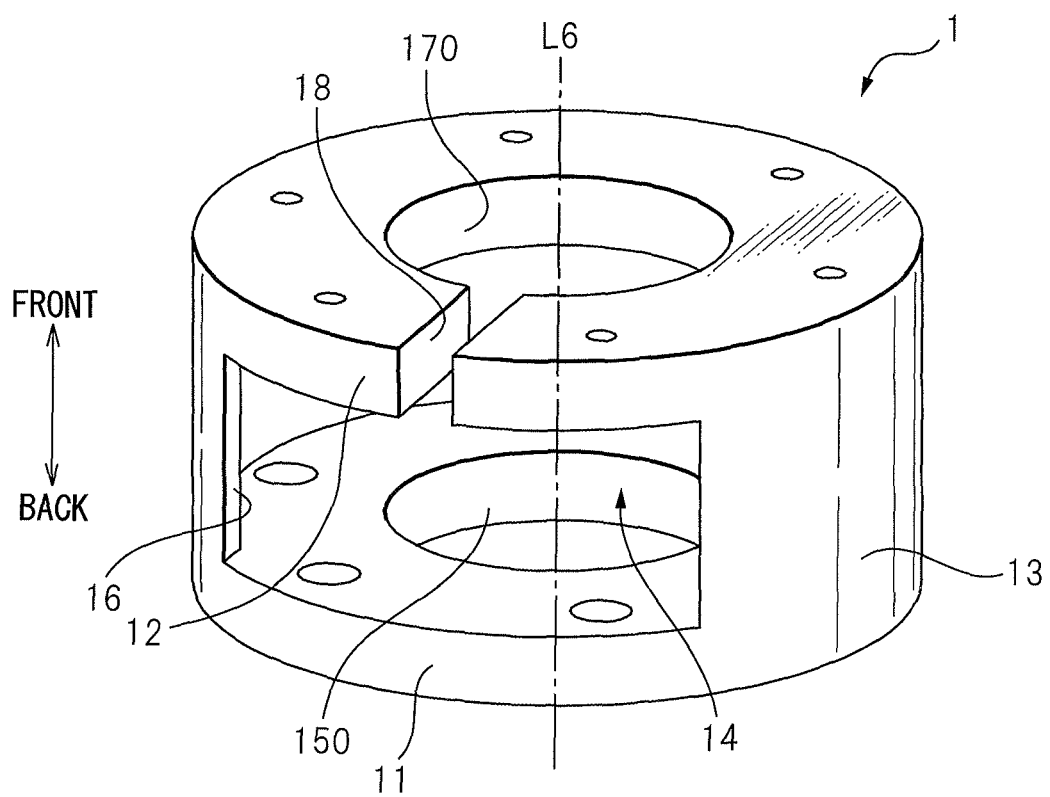
FIG. 8 is a view which shows a modification of FIG. 5.
Figure 8:
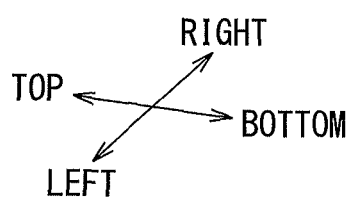

FIG. 8 is a perspective view which shows an example of a umbilical member guide body 1 which is configured in this way. The hole diameter of the first through hole 150 shown in FIG. 8 is slightly larger than the outside diameter of the umbilical member fastening part 2. Due to this, the umbilical member fastening part 2 can be arranged inside of the first through hole 150. In FIG. 8, not only the first through hole 150, but also the second through hole 170 is formed with a hole diameter slightly larger than the outside diameter of the umbilical member fastening part 2.

Figure 9:
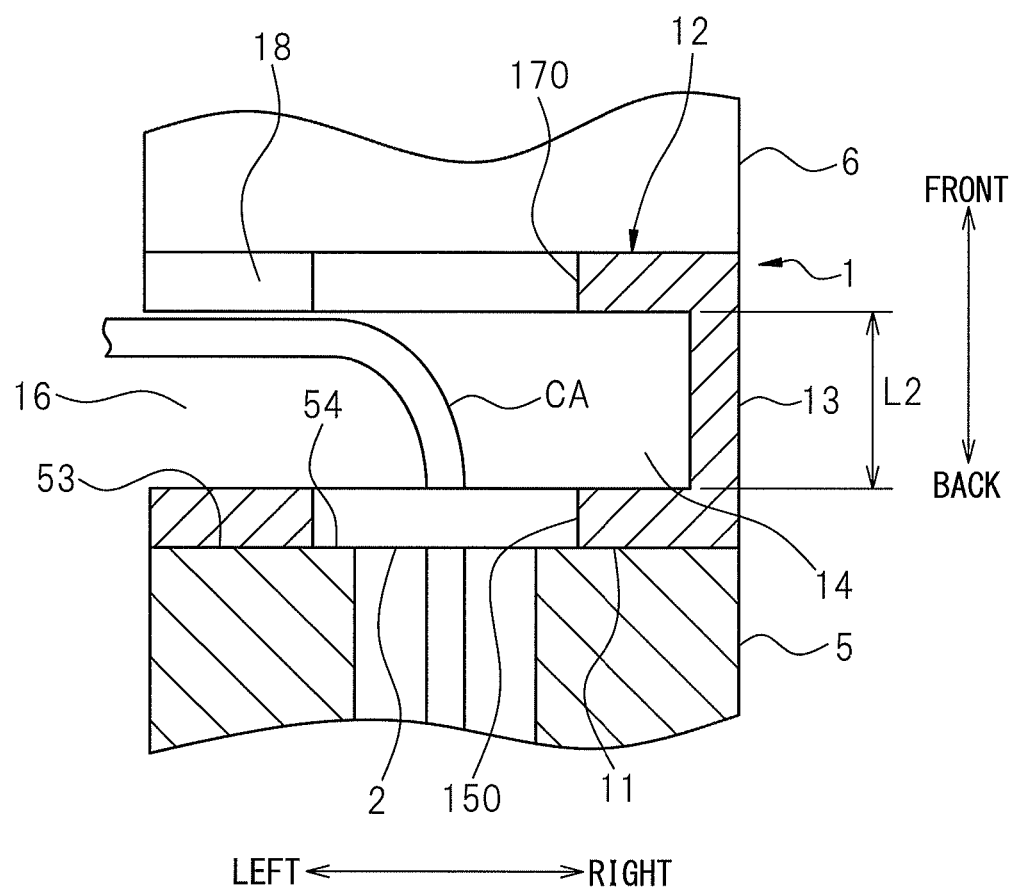
FIG. 9 is a cross-sectional view which schematically shows a mounted state of the umbilical member guide body of FIG. 8.

FIG. 9 is a cross-sectional view which schematically shows the mounted state of the umbilical member guide body 1 of FIG. 8. As shown in FIG. 9, the mounting surface 54 of the shaft member 5 is formed on the same plane as the flange surface 53, so the umbilical member fastening part 2 attached to the mounting surface 54 is housed at the inside of the first through hole 150 of the first plate part 11. In FIG. 9, the thickness of the first plate part 11 is made equal to the thickness D2 of the umbilical member fastening part 2. The umbilical members CA which stick out from the umbilical member fastening part 2, in the same way as FIG. 6, are bent toward the opening part 16 and are taken out through the opening part 16 to outside of the space 14. The distance L2 between the first plate part 11 and the second plate part 12 is set to at least the minimum distance more than or equal to at least the minimum radius of curvature of the umbilical members CA. This distance L2 is longer than the distance L1 of FIG. 6 by the amount by which the umbilical member fastening part 2 moves forward.

When, for example, detaching the umbilical members CA from this state, first, the end effector 6 is detached from the second mounting surface 12a of the umbilical member guide body 1. Next, the umbilical members CA are introduced through the slit 18 of the second plate part 12 to the second through hole 170 of the second plate part 12, and the umbilical members CA are restored to straight states along the axial line L6. After this, the umbilical member fastening part 2 is detached from the shaft member 5 and, as shown by the arrow A of FIG. 10, the umbilical members CA are moved to the front together with the umbilical member fastening part 2. Through the second through hole 170, the umbilical member fastening part 2 is taken out to the outside of the umbilical member guide body 1. Due to this, the umbilical member fastening part 2 can be easily disassembled and assembled. Further, there is no need for the umbilical member guide body 1 to be detached from the shaft member 5, so the work of changing umbilical members CA becomes much easier.

Figure 10:
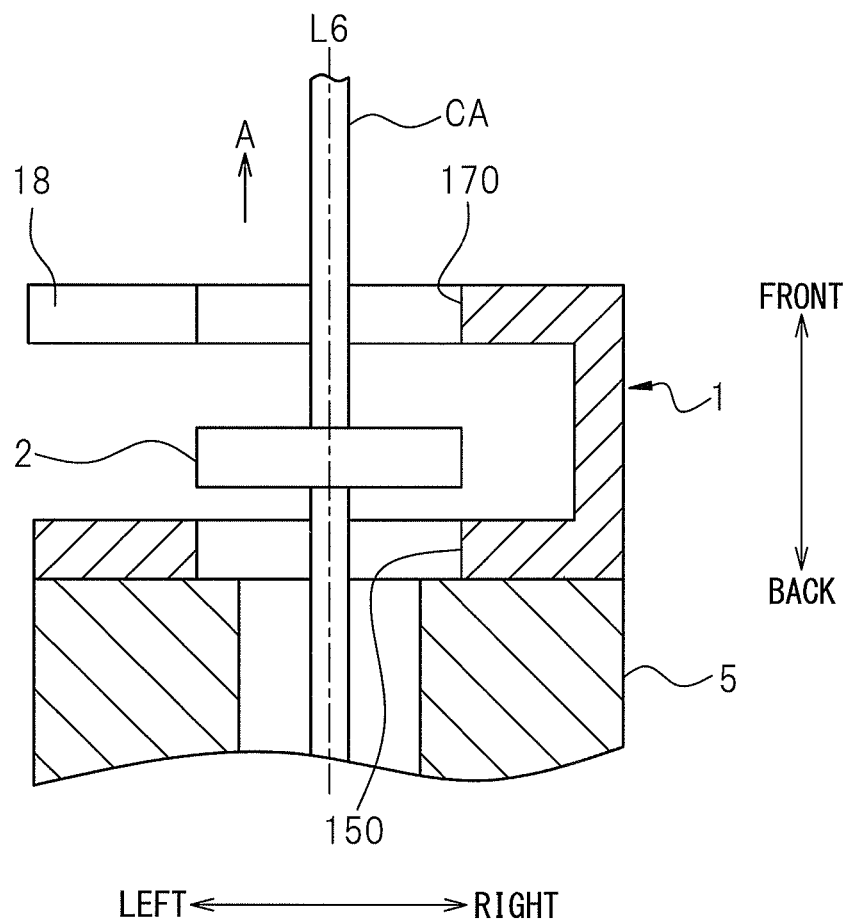
FIG. 10 is a view which explains the procedure in the case of detaching umbilical members from the state of FIG. 9.
Figure 11:
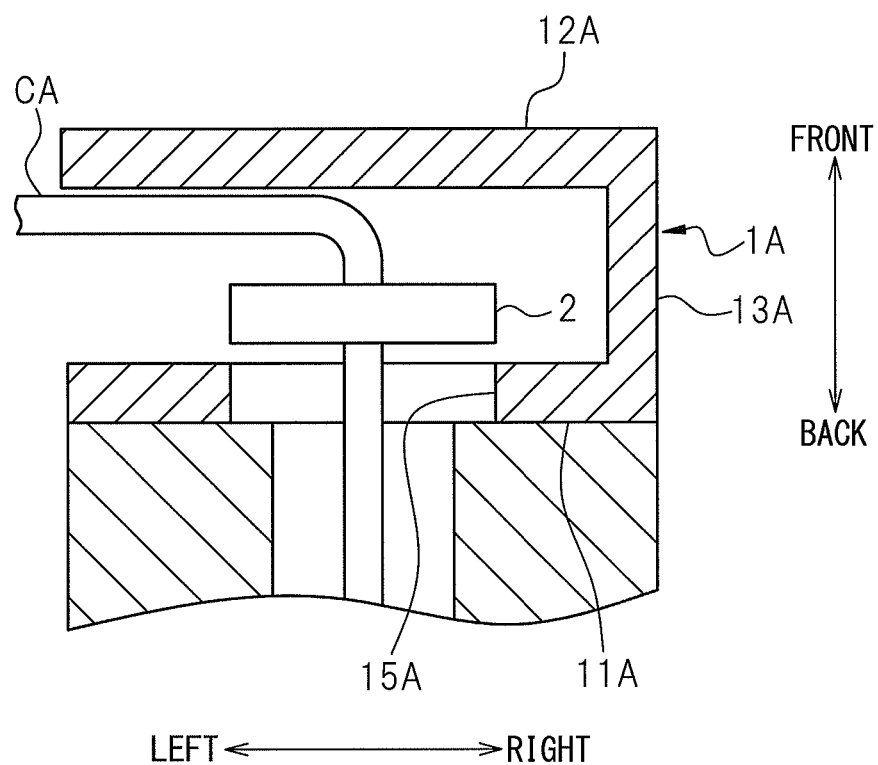
FIG. 11 is a view which shows a comparative example of FIG. 10.

FIG. 11 is a comparative example of the present embodiment (FIG. 10). The umbilical member guide body 1A of FIG. 11 has a first plate part 11A, second plate part 12A, and connecting part 13A. The first plate part 11A has a through hole 15A. On this point, it is the same as the umbilical member guide body 1 of the present embodiment. However, the second plate part 12A does not have the through hole and slit. On this point, it differs from the umbilical member guide body 1 of the present embodiment. In this comparative example, when detaching the umbilical members CA, as shown in FIG. 11, the umbilical member fastening part 2 has to be moved forward. For this reason, the radius of curvature of the umbilical members CA is liable to become smaller than the minimum radius of curvature and the umbilical members CA are liable to be damaged (for example, kinked). On the other hand, in the present embodiment, as shown in FIG. 10, when detaching the umbilical members CA, the umbilical members CA are introduced into the second through hole 170, so it is possible to prevent the radius of curvature of the umbilical members CA from becoming less than the minimum radius of curvature.

Second Embodiment

Figure 12:
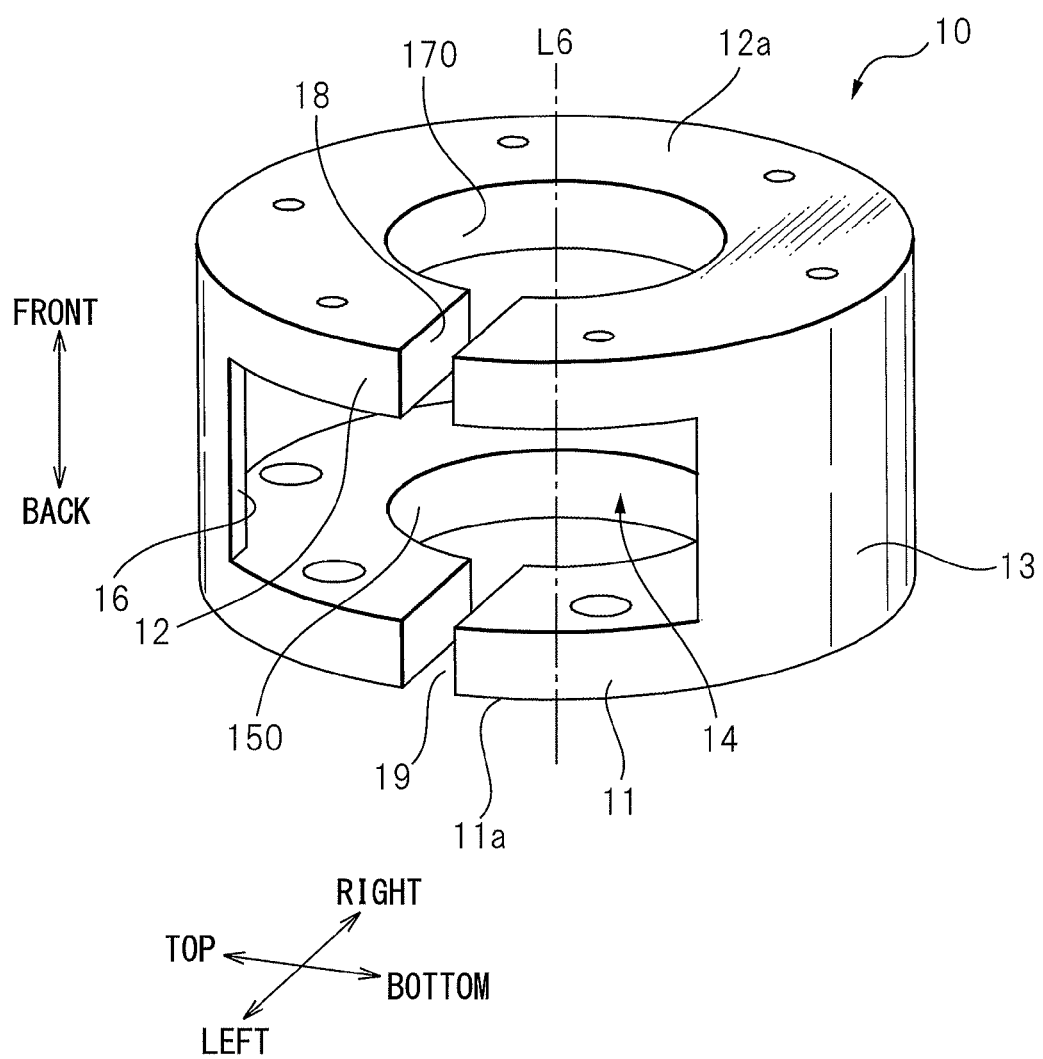
FIG. 12 is a perspective view which shows the general configuration of a umbilical member guide body which forms part of the umbilical member guide device according to a second embodiment of the present invention.

Referring to FIG. 12 to FIG. 16B, a second embodiment of the present invention will be explained. The second embodiment differs from the first embodiment in the configuration of the first plate part 11 of the umbilical member guide body 1. FIG. 12 is a perspective view which shows the general configuration of a umbilical member guide body 10 which forms part of the umbilical member guide device according to the second embodiment. Locations the same as in FIG. 8 are assigned the same notations. Below, the points of difference from the first embodiment will mainly be explained.

As shown in FIG. 12, the first plate part 11 further has a slit 19 which communicates the opening part 16 and the first through hole 150. The position of the slit 19 in the circumferential direction about the axial line L6 matches the position of the slit 18 in the circumferential direction. That is, the slit 18 and the slit 19 are provided at the same phases as each other about the axial line L6. The width of the slit 19 is the same as the width of the slit 18.

Figure 13:
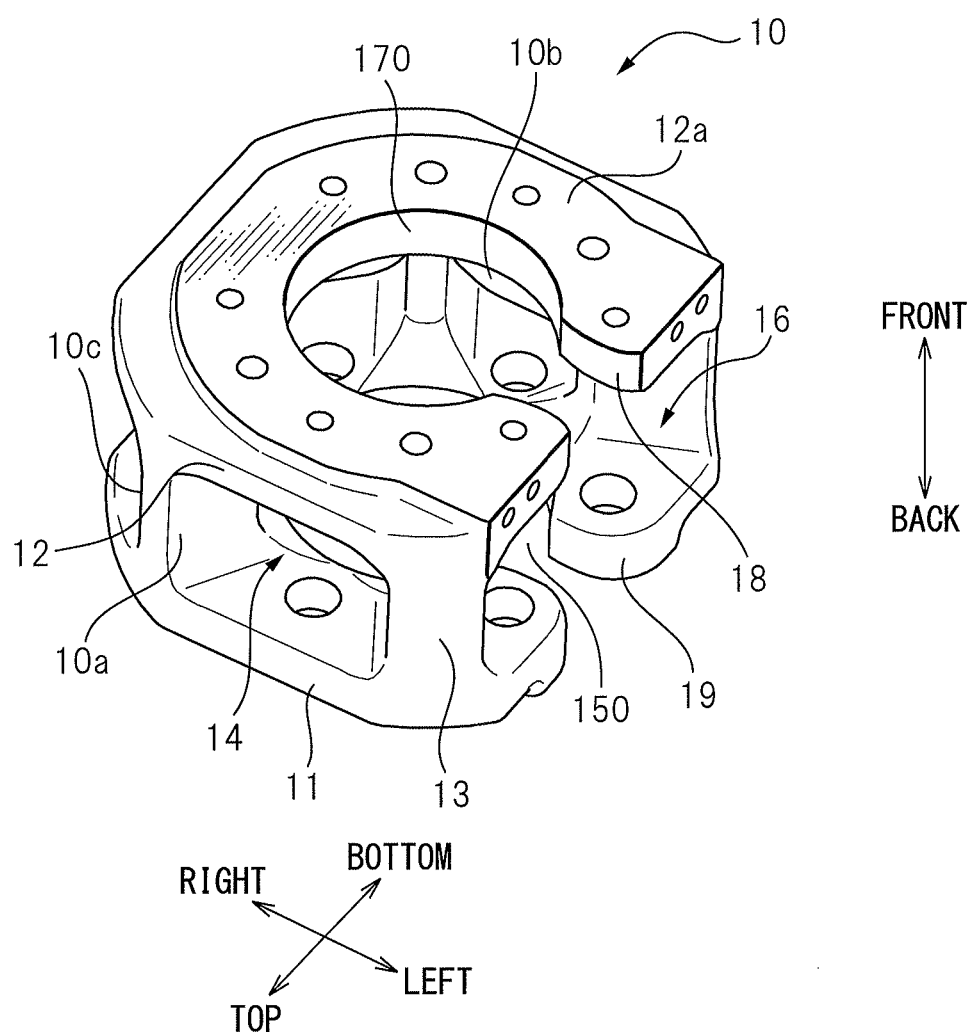
FIG. 13 is a perspective view which shows more specifically the umbilical member guide body of FIG. 12.

FIG. 13 is a perspective view which shows a more specific configuration of the umbilical member guide body 10 according to the second embodiment. As shown in FIG. 13, the top surface, bottom surface, and right surface of the connecting part 13 are provided with opening parts 10a to 10c. Due to this, a user can easily access the space 14 through the opening parts 10a to 10c and can easily attach and detach the umbilical member guide body 10. Further, by providing the opening parts 10a to 10c, the umbilical member guide body 10 can be reduced in weight.

Figure 14A:
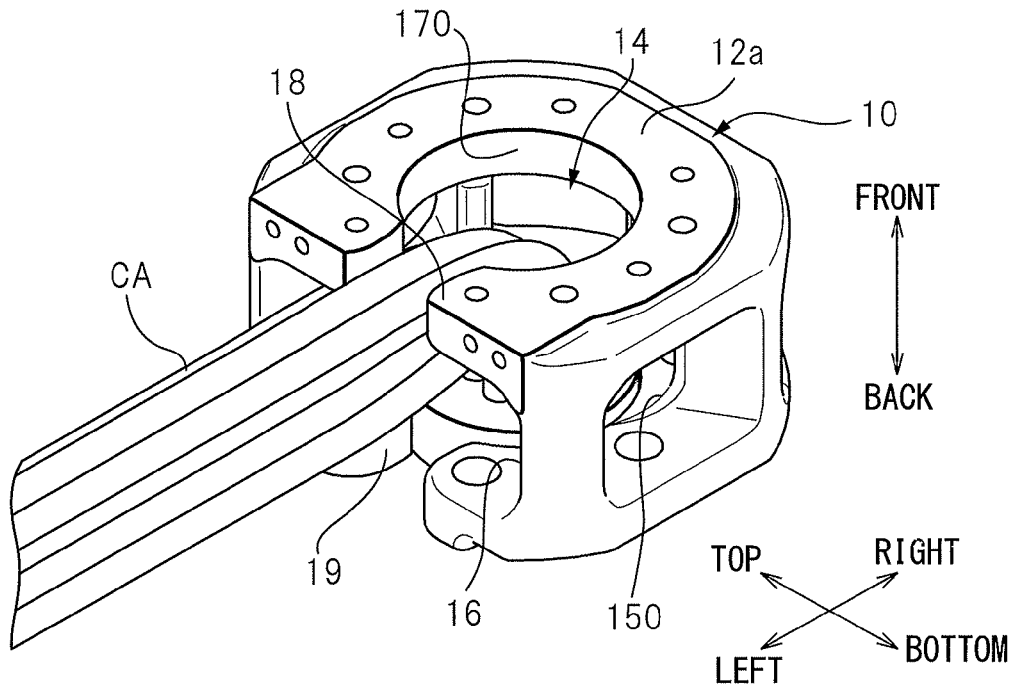
FIG. 14A is a view which explains the procedure in the case of detaching umbilical members using the umbilical member guide body of FIG. 12.
Figure 14B:
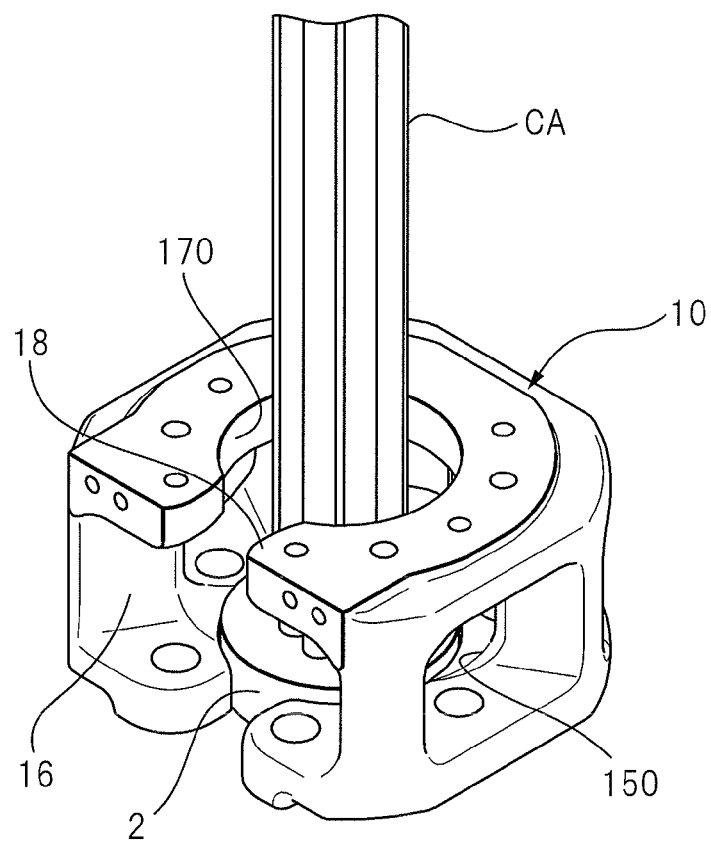
FIG. 14B is a view which explains the procedure in the case of detaching umbilical members using the umbilical member guide body of FIG. 12.
Figure 14C:
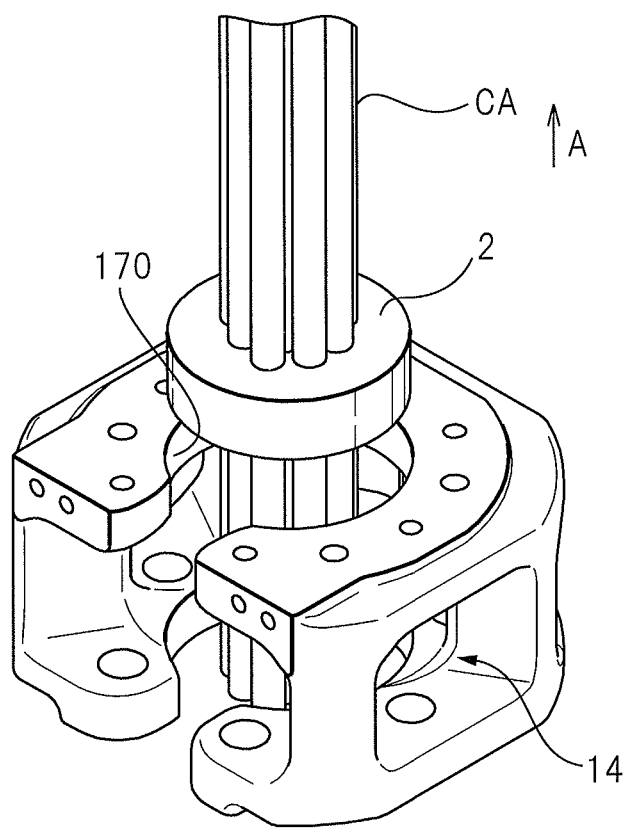
FIG. 14C is a view which explains the procedure in the case of detaching umbilical members using the umbilical member guide body of FIG. 12.

FIG. 14A to FIG. 14C are views which show the procedure for detaching the umbilical members CA. In FIG. 14A to FIG. 14C, illustration of the shaft member 5 and the end effector 6 is omitted. As shown in FIG. 14A, before detaching the umbilical members CA, the umbilical member fastening part 2 is housed inside of the first through hole 150 of the umbilical member guide body 10, then the plurality of umbilical members CA which pass through the umbilical member fastening part 2 are passed through the opening part 16 and taken out to the outside of the space 14.

When, for example, detaching the umbilical members CA from this state, the end effector 6 is detached from the second mounting surface 12a of the umbilical member guide body 10. Next, as shown in FIG. 14B, the plurality of umbilical members CA are introduced into the second through hole 170 through the slit 18 and the umbilical members CA are restored to the straight state. After this, as shown in FIG. 14C, the umbilical members CA are pulled in the arrow A direction and the umbilical member fastening part 2 is taken out to the outside of the space 14 through the second through holes 170, then the umbilical member fastening part 2 is taken apart to release the umbilical members CA from the fixed state.

Figure 15:
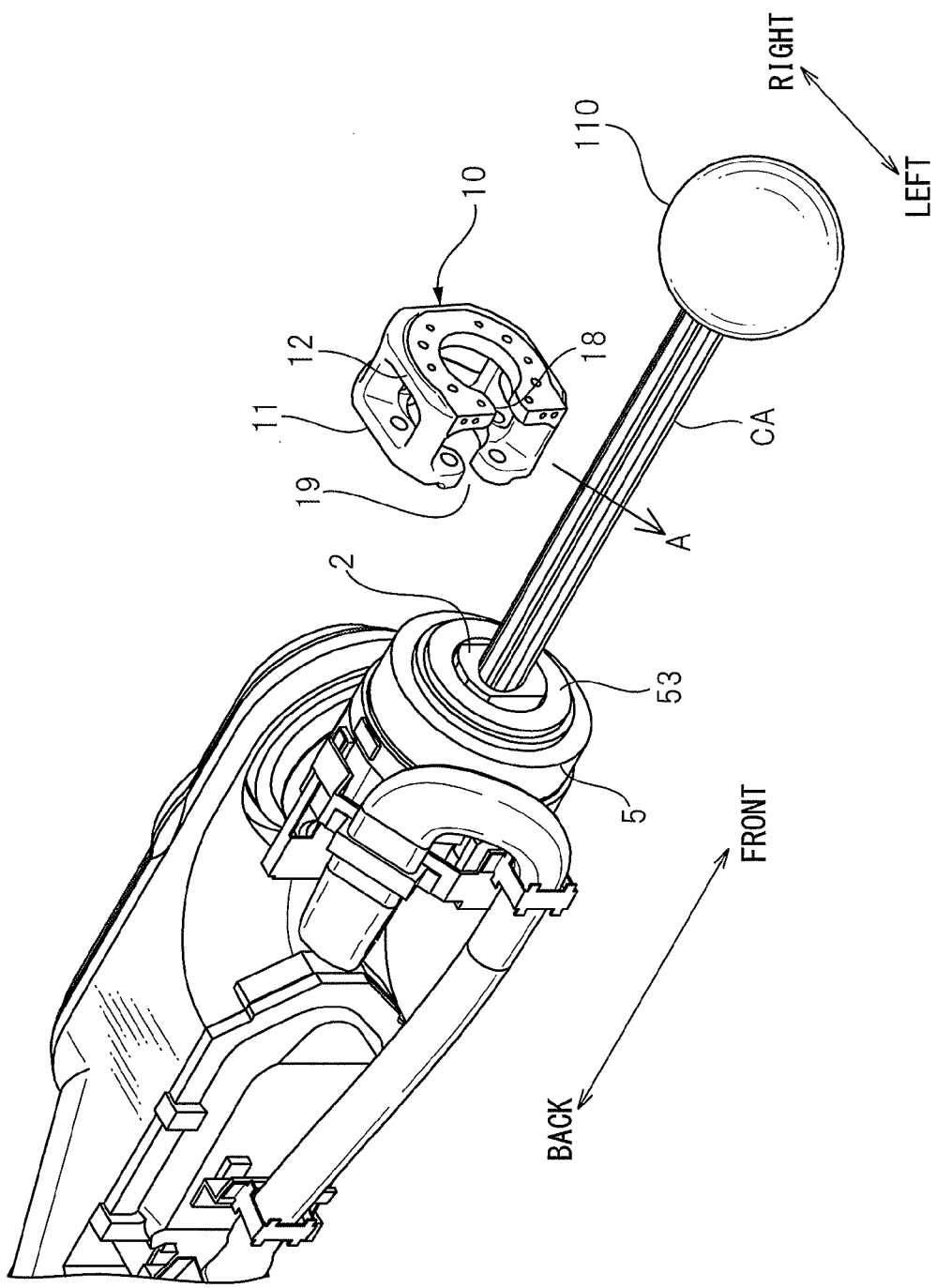
FIG. 15 is a view which shows an example of attachment of the umbilical member guide body of FIG. 12.

In the second embodiment, the first plate part 11 and the second plate part 12 are respectively provided with slits 18 and 19, so the umbilical member guide body 10 can be easily attached to the shaft member 15. This point will be explained using FIG. 15. FIG. 15 is a perspective view which shows the configuration at the front end part of the wrist part 105 of the robot 100. In FIG. 15, at the front end parts of the plurality of umbilical members CA, a connector 110 to be attached to the end effector 6 is connected. When attaching the umbilical member guide body 10, as shown by the arrow A of FIG. 15, the umbilical member guide body 10 is moved toward the umbilical members CA between the shaft member 5 and connector 110, the plurality of umbilical members CA are introduced to the inside of the first through hole 150 and the second through hole 170 through the front-back slits 18 and 19, then the umbilical member guide body 10 is fastened to the flange surface 53 of the shaft member 5.

Due to this, it is possible to attach and detach the umbilical member guide body 10 to the flange surface 53 without detaching the connector 110 connected to the umbilical members CA, so the work of changing the umbilical members CA, etc. becomes easy. Depending on the application of use of the robot 100, sometimes the umbilical member guide body 10 can be omitted. If considering this point, it is preferable to enable attachment of the umbilical member guide body 10 after connecting the umbilical members CA to the connector 110, etc. For example, when using an end effector 6 with a through hole provided at its back end face and connecting the umbilical members CA through the through hole to the end effector 6, the umbilical member guide body 10 is omitted. When changing to another end effector with no through hole at its back end face from this state, the umbilical member guide body 10 has to be attached. However, the umbilical member guide body 10 has the front-back pair of slits 18 and 19 and the through holes 150 and 170, so attachment of the umbilical member guide body 10 in this case is also easy.

Figure 16A:
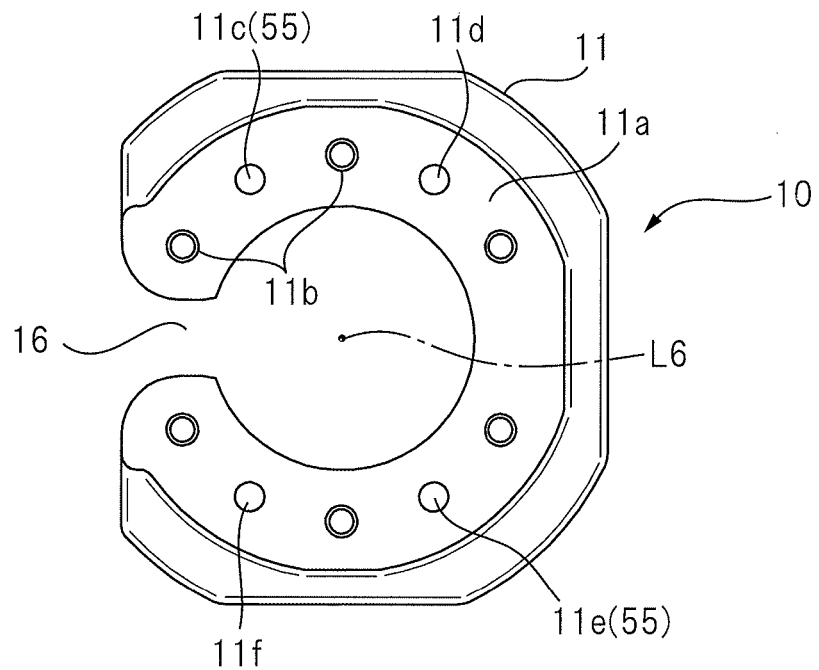
FIG. 16A is a view of the umbilical member guide body of FIG. 12 seen from the back.
Figure 16B:
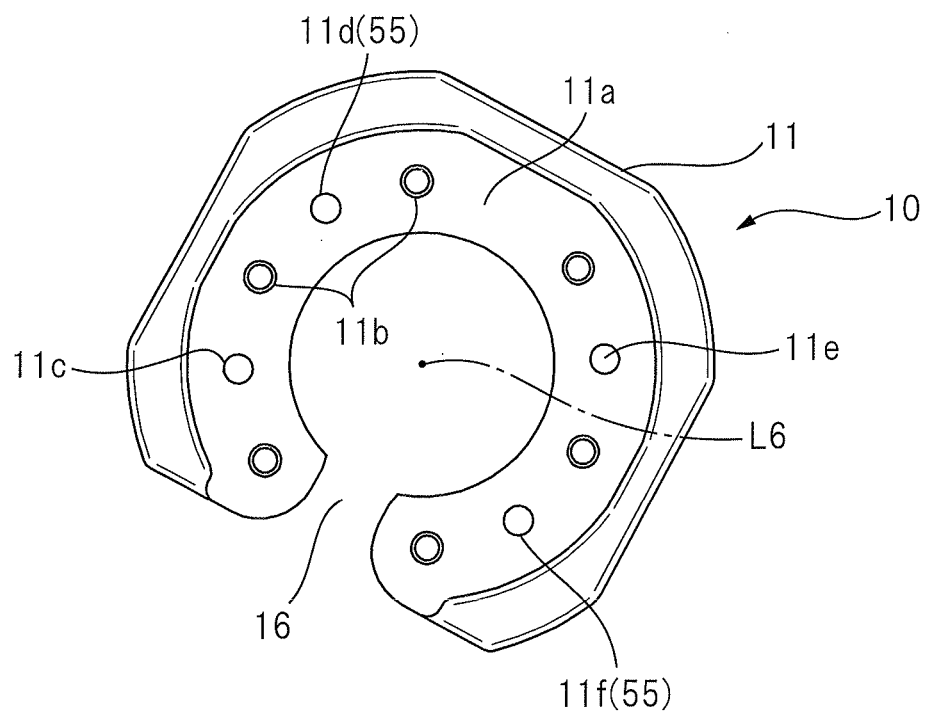
FIG. 16B is a view of the umbilical member guide body of FIG. 12 seen from the back.

FIG. 16A and FIG. 16B are views of a umbilical member guide body 10 of a second embodiment of the present invention seen from the back. As shown in FIG. 16A, the first plate part 11 is provided with a plurality of (six) through holes 11b in the circumferential direction, corresponding to the screw holes 53a of the flange surface 53 of the shaft member 5 (FIG. 4). Furthermore, the first plate part 11 (first mounting surface 11a) is formed with a plurality of (four) pin holes 11c to 11f in the circumferential direction.

When attaching the umbilical member guide body 10 to the shaft member 5, pins 55 are inserted into two of the four pin holes 11c to 11f, that is, the pin holes 11c and 11e or 11d and 11f. FIG. 16A is an example of insertion of the pins 55 into the pin holes 11c and 11e, while FIG. 16B is an example of insertion of the pins 55 into the pin holes 11d and 11f. In FIG. 16A, the umbilical member guide body 10 is positioned at a first phase about the axial line L6, while in FIG. 16B, the umbilical member guide body 10 is positioned at a second phase about the axial line L6. That is, in FIG. 16A and FIG. 16B, the umbilical member guide bodies 10 are positioned and fastened at different phases from each other relative to the shaft member 5. By inserting the pins 55 into the different pin holes 11c and 11e or 11d and 11f in this way, the phase of the opening part 16 changes and the direction of taking out the umbilical members CA can be changed.

Modifications

In the above embodiments, although a plurality of umbilical members CA are guided from the shaft member 5 to the end effector 6, a single umbilical member CA may also be guided. Although the opening part 16 and the second through hole 17, 170 are communicated by a slit 18, the configuration of the communicating part (second communicating part) is not limited to this. Further, in the second embodiment, although the opening part 16 and the first through hole 15, 150 are communicated by a slit 19, the configuration of the communicating part (first communicating part) is not limited to this. In the above embodiments, although the umbilical member fastening part 2 is attached to the flange surface side of the shaft member 5, the umbilical member fastening part 2 may also be omitted and the umbilical member guide device configured by only the umbilical member guide body 1, 10.

In the above second embodiment, although the pin holes 11c and 11e or 11d and 11f are used to position the umbilical member guide body 10 at the first phase or the second phase, the configurations of the first positioning part and the second positioning part are not limited to this. The umbilical member guide body 1 according to the first embodiment, like the second embodiment, may also be provided with the first positioning part and the second positioning part. The umbilical member guide device of the present invention can be applied to various industrial robots. The configuration of the robot 100 is not limited to the one explained above.

The above embodiments can be freely combined with one or more of the modifications.

According to the present invention, the umbilical members can be introduced to the second through hole through the communicating part of the umbilical member guide body and the umbilical members can be detached after restoring the umbilical members to their straight states, so the work of changing umbilical members can be performed easily.

Above, while the present invention has been described with reference to the preferred embodiments thereof, it will be understood, by those skilled in the art, that various changes and modifications may be made thereto without departing from the scope of the appended claims.

The invention claimed is:

1. An umbilical member guide device of an industrial robot for guiding an umbilical member up to an end effector attached to a front end part of an industrial robot, the umbilical member passing through an inside of a shaft member rotating about an axial line, along the axial line,
the umbilical member guide device comprising an umbilical member guide body interposed between the shaft member and the end effector,
wherein the umbilical member guide body comprises:
a first plate part having a first mounting surface attached to a flange surface of an end part of the shaft member and a first through hole opening along the axial line, the umbilical member being passed through the inside of the shaft member and the first through hole;
a second plate part arranged facing the first plate part, and having a second mounting surface to which the end effector is attached, at an opposite side to the first plate part; and
a connecting part connecting the first plate part and the second plate part together, and forming an opening part which opens in a direction perpendicular to the axial line, between the first plate part and the second plate part, and
wherein the second plate part further has a second through hole formed along the axial line and a communicating part formed as an opening extending generally radially along the second plate part for communicating the opening part and the second through hole.

2. The umbilical member guide device of an industrial robot according to claim 1, wherein
a plurality of umbilical members are passed through the inside of the shaft member,
the first through hole and the second through hole respectively have hole diameters so as to allow the plurality of umbilical members to pass through and the opening part has an opening area so as to allow the plurality of umbilical members to pass through, and
the communicating part is configured by a slit of a width greater than an umbilical member with a maximum outside diameter among the plurality of umbilical members.

3. The umbilical member guide device of an industrial robot according to claim 1, wherein
the umbilical member guide device further comprises an umbilical member fastening part attached to a side of the flange surface of the shaft member and fastening the umbilical member at an inside from an outer circumference of the flange surface, and
the first through hole and the second through hole have hole diameters to allow the umbilical member fastening part to pass through.

4. The umbilical member guide device of an industrial robot according to claim 1, wherein
the first plate part further has a first communicating part communicating the opening part and the first through hole, and the communicating part of the second plate part is a second communicating part, the first communicating part and the second communicating part being provided at the same phase as each other about the axial line.

5. The umbilical member guide device of an industrial robot according to claim 1, wherein
the first plate part has a first positioning part positioning the first plate part at a first phase about the axial line and a second positioning part positioning the first plate part at a second phase different from the first phase, relative to the flange surface.

6. An industrial robot comprising the umbilical member guide device according to claim 1.

7. An umbilical member guide device of an industrial robot for guiding an umbilical member up to an end effector attached to a front end part of an industrial robot, the umbilical member passing through an Inside of a shaft member rotating about an axial line, along the axial line,
the umbilical member guide device comprising an umbilical member guide body interposed between the shaft member and the end effector,
wherein the umbilical member guide body comprises:
a first plate part having a first mounting surface attached to a flange surface of an end part of the shaft member and a first through hole opening along the axial line, the umbilical member being passed through the Inside of the shaft member and the first through hole;
a second plate part arranged facing the first plate part, and having a second mounting surface to which the end effector is attached, at an opposite side to the first plate part; and
a connecting part connecting the first plate part and the second plate part together, and forming an opening part which opens in a direction perpendicular to the axial line, between the first plate part and the second plate part,
wherein the second plate part further has a second through hole formed along the axial line and a communicating part communicating the opening part and the second through hole, and
wherein
a plurality of umbilical members are passed through the inside of the shaft member,
the first through hole and the second through hole respectively have hole diameters so as to allow the plurality of umbilical members to pass through and the opening part has an opening area so as to allow the plurality of umbilical members to pass through, and
the communicating part is configured by a slit of a width greater than an umbilical member with a maximum outside diameter among the plurality of umbilical members.

8. An umbilical member guide device of an Industrial robot for guiding an umbilical member up to an end effector attached to a front end part of an industrial robot, the umbilical member passing through an inside of a shaft member rotating about an axial line, along the axial line,
the umbilical member guide device comprising an umbilical member guide body interposed between the shaft member and the end effector,
wherein the umbilical member guide body comprises:
a first plate part having a first mounting surface attached to a flange surface of an end part of the shaft member and a first through hole opening along the axial line, the umbilical member being passed through the inside of the shaft member and the first through hole;

a second plate part arranged facing the first plate part, and having a second mounting surface to which the end effector is attached, at an opposite side to the first plate part; and a connecting part connecting the first plate part and the second plate part together, and forming an opening part which opens in a direction perpendicular to the axial line, between the first plate part and the second plate part, wherein the second plate part further has a second through hole formed along the axial line and a communicating part communicating the opening part and the second through hole, and wherein
the umbilical member guide device further comprises an umbilical member fastening part attached to a side of the flange surface of the shaft member and fastening the umbilical member at an inside from an outer circumference of the flange surface, and the first through hole and the second through hole have hole diameters to allow the umbilical member fastening part to pass through.

\* \* \* \* \*